United States Patent [19]

Decavele et al.

[11] Patent Number: 4,498,000
[45] Date of Patent: Feb. 5, 1985

[54] SECURITY METHOD AND DEVICE FOR COMMUNICATING CONFIDENTIAL DATA VIA AN INTERMEDIATE STAGE

[75] Inventors: Dominique Decavele, Chevreuse; Jean-Pierre Fournier, Paris, both of France

[73] Assignee: Transac-Alcatel, Paris, France

[21] Appl. No.: 414,255

[22] PCT Filed: Dec. 30, 1981

[86] PCT No.: PCT/FR81/00173
§ 371 Date: Aug. 12, 1982
§ 102(e) Date: Aug. 12, 1982

[87] PCT Pub. No.: WO82/02446
PCT Pub. Date: Jul. 22, 1982

[30] Foreign Application Priority Data
Jan. 7, 1981 [FR] France ................. 81 00128

[51] Int. Cl.³ .............................................. G06K 5/00
[52] U.S. Cl. .................................. 235/380; 235/379; 235/382.5; 235/492
[58] Field of Search ............... 235/379, 382, 382.5, 235/380, 381, 492

[56] References Cited
U.S. PATENT DOCUMENTS

| 3,806,874 | 4/1974 | Ehrat . |
| 4,001,550 | 1/1977 | Schatz . |
| 4,016,405 | 4/1977 | McCune et al. ............ 235/379 |
| 4,023,013 | 5/1977 | Kinker ..................... 235/379 |
| 4,048,475 | 9/1977 | Yoshida .................... 235/380 |
| 4,214,230 | 7/1980 | Fak et al. . |

FOREIGN PATENT DOCUMENTS

| 7002 | 1/1980 | European Pat. Off. . |
| 29894 | 6/1981 | European Pat. Off. . |
| 7717436 | 1/1979 | France . |
| 2019060 | 10/1979 | United Kingdom . |

Primary Examiner—David L. Trafton
Attorney, Agent, or Firm—Sughrue, Mion, Zinn, Macpeak & Seas

[57] ABSTRACT

The invention relates to a method and devices allowing exchange of data between authorized bearers of crediting means (1) to be identified, approved and possibly coded and to remote centralized processing machines (3) via specific terminal units (2). The data produced by a bearer of a crediting means (1) after connection of said means (1) to a terminal unit (2) and sending of the identity of said means (1) are approved by a logic generation unit (15) of the means (1) from an individualization code and from transaction data. The invention applies to the exchange of data in an insecure environment and more particularly to bank credit card systems.

8 Claims, 3 Drawing Figures

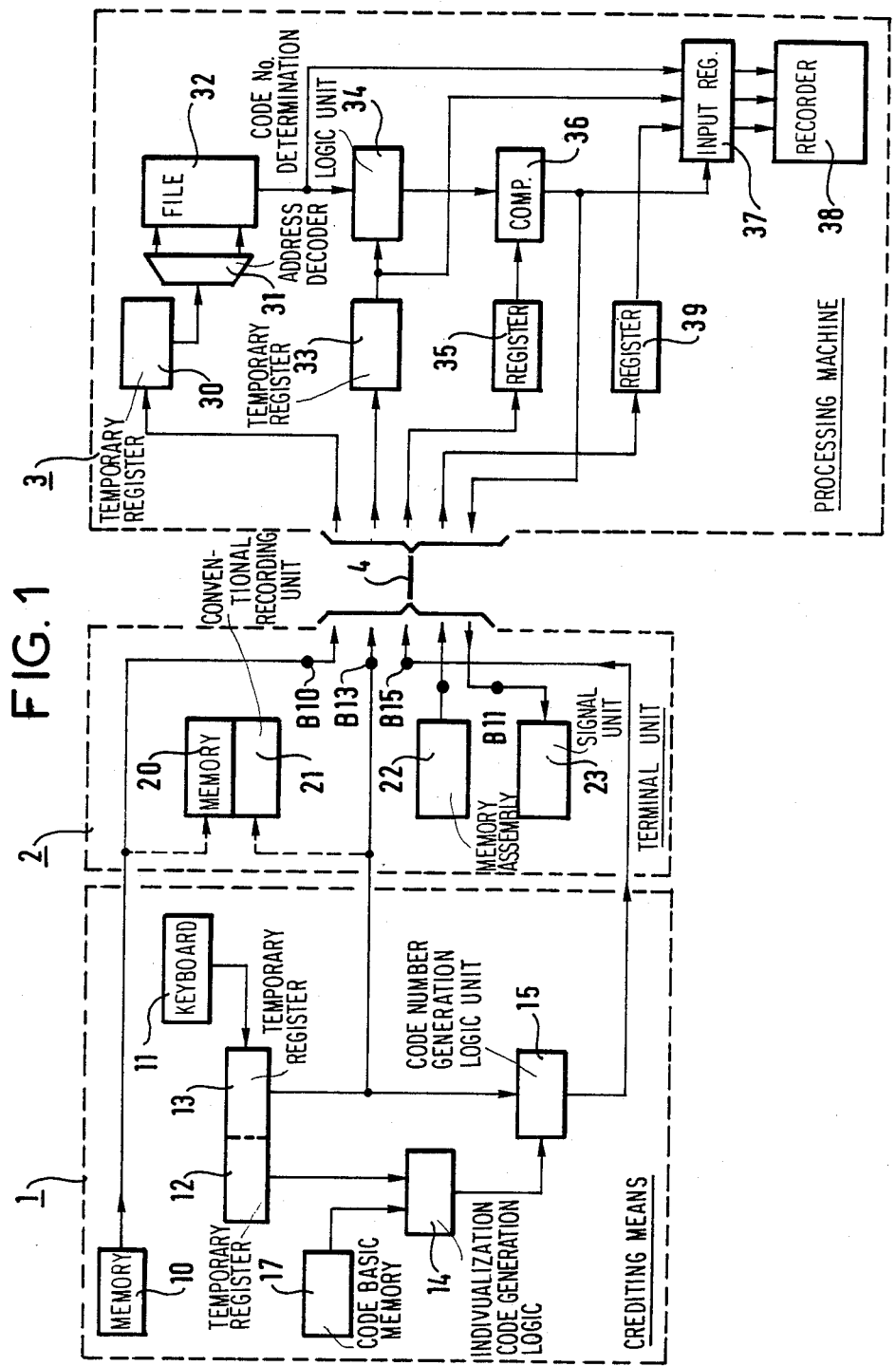

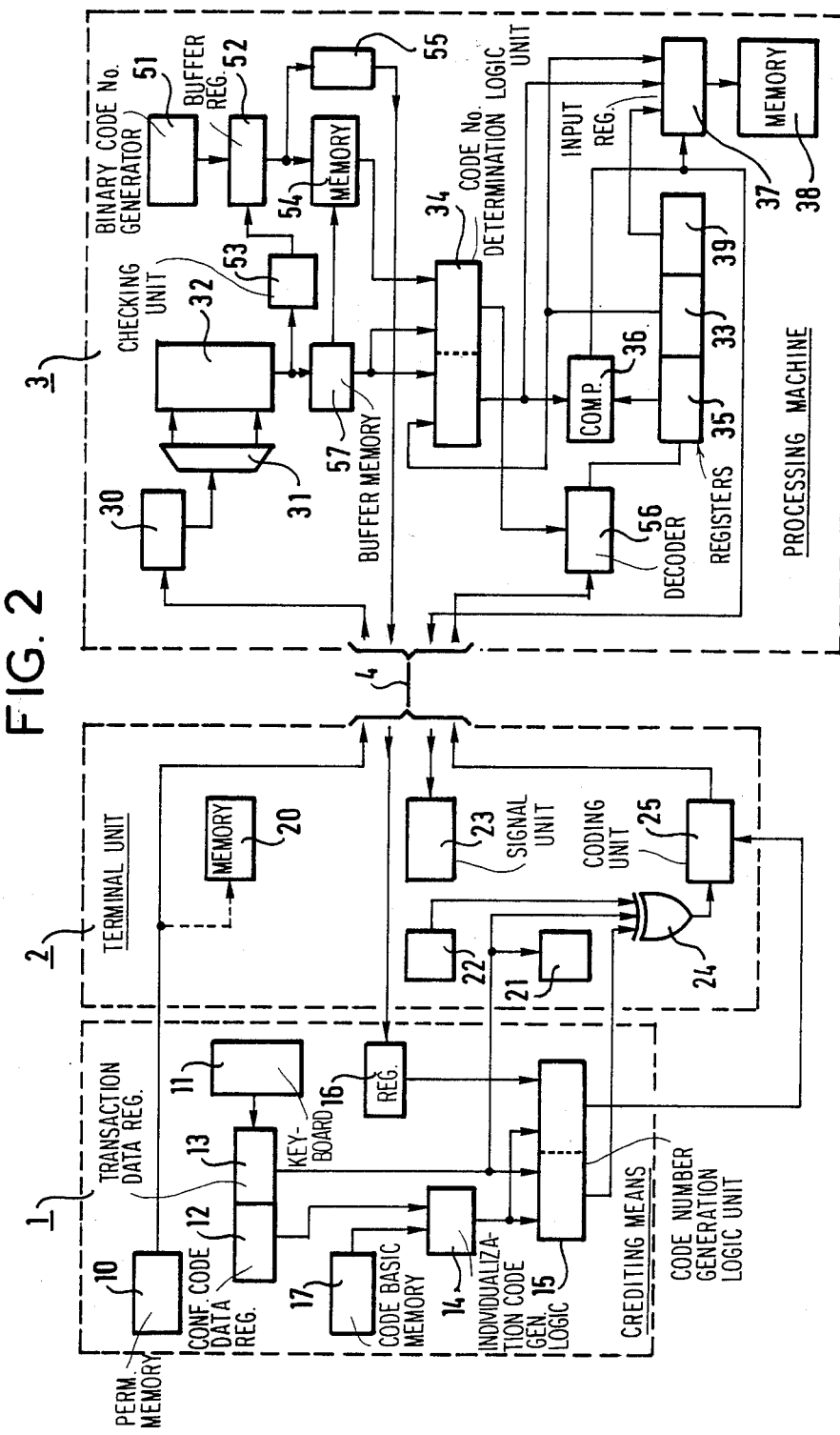

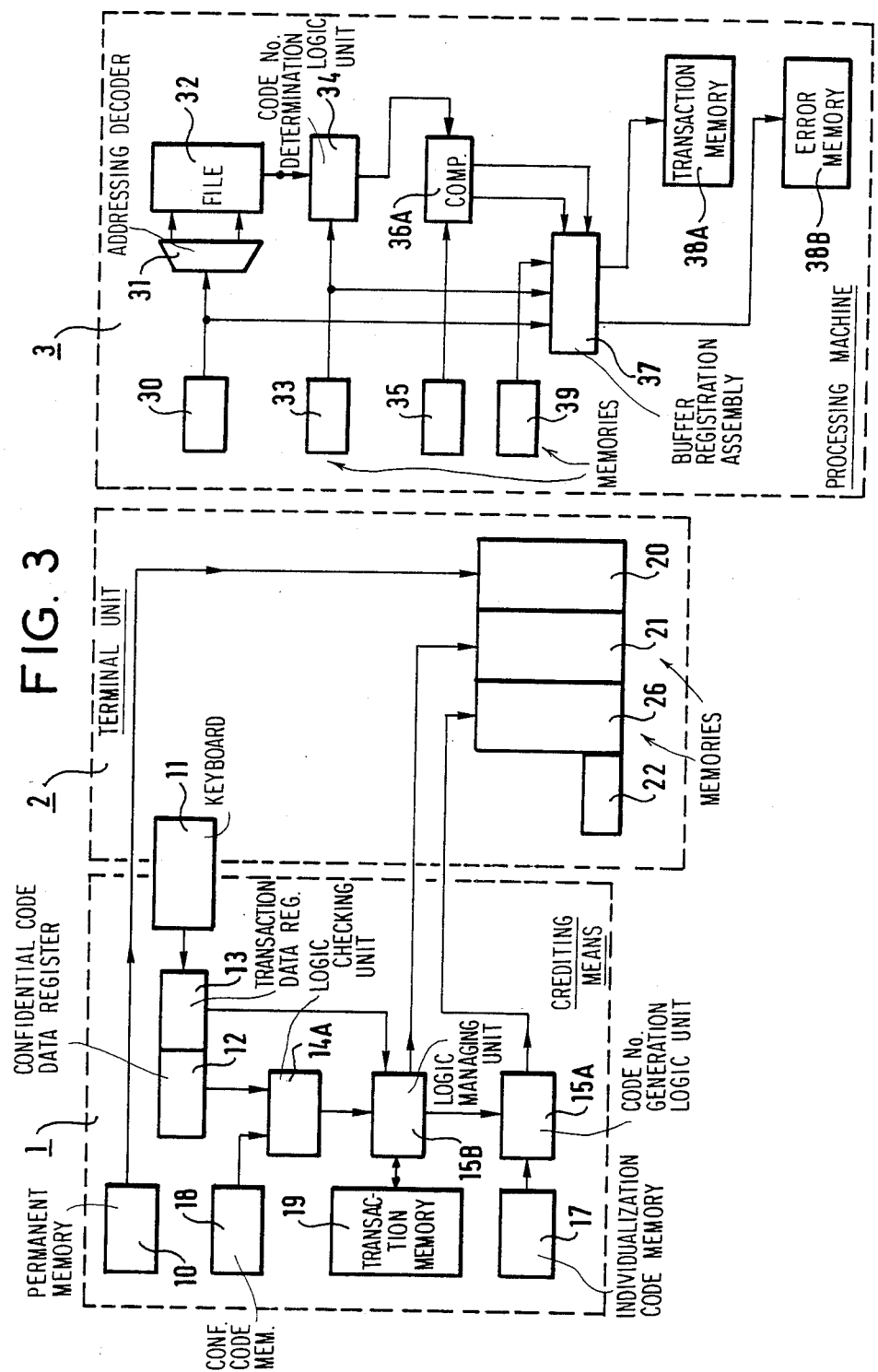

4,498,000

SECURITY METHOD AND DEVICE FOR COMMUNICATING CONFIDENTIAL DATA VIA AN INTERMEDIATE STAGE

FIELD OF THE INVENTION

The present invention relates to security methods and devices for confidential data communication in digital form via intermediate stages; it applies to systems which allow data exchange between bearers of crediting means and centralized processing machines via specific independent non-supervized terminal units. More particularly the invention makes it possible to identify, approve and possibly encode exchanges of data between an authorized bearer of a crediting means and a remote centralized processing machine via an independent specific terminal unit, so as to preserve the confidential nature of the private data when indiscretion is to be feared.

BACKGROUND OF THE INVENTION

In a known manner, such crediting means are used as means for allowing access; a known example of this is a bank credit card which allows money to be withdrawn from some distributor terminal units in addition to payment to other specific terminal units. In the example mentioned hereinabove it is conventional to leave some terminal units practically without any supervision by banks which own centralized processing machines for transactions and also not to supervise the bearers of crediting means.

As such means are intended to keep the accesses which they control exclusively for authorized users, it is to be feared that malevolent third parties will attempt to take fraudulent advantage of the possibilities afforded by passing themselves off as authorized users or by falsifying the data.

This leads to checking the identity of the bearers of crediting means via terminals by comparing the confidential digital data registered on the crediting means with confidential data composed by bearers. However, it may be feared that such confidential data will possibly become known at the terminal units and be used to modify or add data.

Likewise, data transmitted by links over long distances is coded to prevent fraudulent tapping of confidential data by connecting a tap line to the links and hence the transmission of false data. Now, in the case of communications between two parties via a third party, said third party is particularly well placed to modify data exchanged by the other two to his benefit.

To remedy these drawbacks, the invention proposes a method and devices which tend to prevent the communication of the private data of each of the parties and to approve the data emitted.

SUMMARY OF THE INVENTION

In accordance with the invention, any communication between a bearer of a crediting means and a centralized processing machine includes the following steps:

communication of the identity of the crediting means used by the bearer to the centralized processing machine by connection of said crediting means in a specific terminal unit;

communication of the holder's specific confidential code to the system by manual insertion of said code by the bearer in the assembly formed by the crediting means and the terminal unit;

using the crediting means to determine a holder identification and transaction approval code signal by combination of the bearer's transaction data with an individualization code supplied by the crediting means when it receives the holder's confidential code;

communication of the code number, of the transaction data and of the identity of the terminal unit which is specific to the centralized processing unit by said specific terminal on the basis of the data received from the crediting means and of the data which is inherent to it.

Other features and advantages of the invention will become apparent from the description and with reference to the figures mentioned hereinbelow.

BRIEF DESCRIPTION OF THE DRAWINGS

FIG. 1 illustrates the essential components of a system for communicating confidential data between bearers of crediting means and centralized processing machines via specific terminals, in accordance with the invention.

FIG. 2 illustrates the essential components of a system for communicating coded confidential data, in accordance with the invention.

FIG. 3 illustrates the essential components of a system for deferred communication of confidential data, in accordance with the invention.

DESCRIPTION OF THE PREFERRED EMBODIMENT

The system which is schematically illustrated in FIG. 1 is constituted by a plurality of crediting means which can be connected to specific terminal units to allow the bearers of said means to exchange data with centralized processing machines; FIG. 1 outlines crediting means 1, a terminal unit 2 and a processing machine 3, showing all components necessary to make an understandable illustration of the invention.

In a known way which is outlined hereinbefore, each crediting means such as 1 is ascribed to a particular holder for his own needs. Said holder is conventionally allowed to exchange data with a centralized processing machine such as 3 providing he finds a specific terminal unit such as 2 with which to connect the crediting means 1 he holds and providing he is capable of proving that he is actually authorized to use said crediting means 1 by composing the confidential code which allows the use thereof.

With this aim in view, conventionally, each crediting means 1 which is preferably a card, has a memory 10 for storing identity data, said memory 10 is a permanent memory acessible for reading by the specific terminal units 2 and it conains binary data. The crediting unit 1 which contains such data is thereby distinguished from all others.

Said memory 10 is, for example a magnetic memory, a hard wired memory or a readable electronic memory which cannot be obliterated by conventional means.

In the embodiment illustrated in FIG. 1, it is assumed that the specific terminal units 2 are linked to the centralized processing machines 3 by transmission links symbolically referenced 4 which are set up at least for the duration of each transaction.

The identity data contained in the memory 10 of a crediting means 1 are transmitted to the centralized processing machine 3 which is linked to the specific terminal unit 2 to which the crediting means 1 is connected for a transaction. In a known way, the specific terminal unit 2 can be designed to store said identity data which is related to the transaction being made in a memory 20 and to transmit a card identity recognition signal so as to allow the communication process to be continued.

In accordance with a preferred embodiment of the invention, a keyboard 11 is provided on each crediting means 1 and is possibly simplified compared with conventional keyboards; said keyboard 11 allows the bearer of the crediting means to key the chosen confidential code which has been determined by the holder of the crediting means 1 and which may have been disclosed to the bearer if he is not the holder.

The keyboard 11 is connected to a first temporary register 12 which allows the confidential code keyed by the bearer for the duration of the transaction.

The register 12 is linked by its outputs to a first group of inputs of a individualization code generation logic unit 14 which has a second group of inputs connected to a code basic memory 17. The code basic memory 17 is a permanent memory which is normally inaccessible from the outside after initial writing thereto and contains a long succession of binary data, e.g. a succession of 56 bits which are combined with the confidential code generated by the individualization code generation logic unit 14. Conventional gates, e.g. basically exclusive OR circuits, are used to effect said combination.

The individualization code obtained is known by the centralized processing machines 3 and by them alone; said code is associated with the card identity data relative to the card in a file 32 containing the codes of holders of crediting means which data is stored in the memories of said machines 3. Consequently, the centralized processing machine 3 which is linked to the specific terminal unit 2 to which the crediting means 1 in question is linked is capable of finding in the file 32 the individualization code corresponding to the received identification data. It does so via a conventional address decoder 31 which is caused to operate by the identification data stored in a temporary register 30.

It must be observed that the confidential code chosen by a holder of a crediting means is not disclosed to the terminal units and to the processing machines and need therefore not be known by people other than the holder and those whom he authorizes to use his crediting means.

The bearer of the crediting means 1 personally keys the data of the transaction he wishes to make, e.g. the sum to be paid, it being understood that in accordance with the operation method chosen, some data such as time can be inserted either in the crediting means 1 or in the terminal unit 2, in particular when the latter is a dispensing terminal unit.

The transaction data inserted by the bearer of the crediting means 1 using the keyboard 11 is temporarily memorized in a register 13 for said means 1. The outputs of the register 13 are connected in parallel with a first group of inputs of a code number generation logic unit 15 and to at least one connection terminal B13 of a terminal unit so as to allow the transmission of said data in series to the outside of the crediting means 1.

The code number generation logic unit 15 ensures that the transaction data is combined in accordance with an algorithm of conventional structure with the individualization code which has, e.g. 56 bits so that the code number is very complex.

In the embodiment chosen, the generation logic unit 15 is constituted firstly by a microprocessor which also performs other functions not mentioned here since they are not related to the invention.

The code number obtained is transmitted to the centralized processing machine 1 via the specific terminal unit 2 as is the transaction data contained in the register 13 and the identification and transaction data inherent to the owner of the terminal unit, which data is previously stored in a memory assembly 22 which conventionally includes at least one permanent identity data memory and a transaction data write-in memory which can be obliterated.

In a known way, the non-confidential data of the register 13 can be registered and displayed in the terminal unit 2 by a conventional recording unit 21 for checking before transmission and generation of the code number.

The centralized processing machine 3 receives the bearer's transaction data transmitted in clear digital form a well as the code number and the identification and transaction data inherent to the terminal. The bearer's transaction data is memorized temporarily in a register 33 whose outputs are connected to a code number determination logic unit 34 whose function is analogous to that of the logic unit 15.

The output of the file 32 is also connected to the determination logic unit 34 so that said unit can determine a code number from the code defined by the contents of the register 30 and of the transaction data contained in the register 33.

The code number produced by the determination logic unit 34 is transmitted to a comparator 36 which also receives the code number transmitted by the crediting means 1 which is stored in a register 35.

If the two numbers are identical, the comparator emits an enabling order firstly to the enable signal unit 23 of the terminal unit 2 and secondly towards the operation input of a transaction memory input register 37 so as to allow data supplied by the file 32 to be recorded, while the registers 33 and 39 of the file receive the data of the memory assembly 22.

The enable signal unit 23 is of a conventional type and in particular allows the registers of the terminal unit 2 and of the crediting unit 1 to be reset to zero and the crediting unit to be withdrawn.

The embodiment illustrated in FIG. 2 has coding means intended to prevent data from being collected without authorization by third parties by means of data acquisition systems connected to the transmission links.

In accordance with the invention, coding is performed in each terminal unit by a coding system 27 which receives the data to be coded and a coding key.

In accordance with the invention, the coding key is obtained by identically processing binary numbers generated, by crediting means 1 or by the centralized processing machines 3.

In the embodiment described in which a crediting means 1 is connected in a specific terminal unit 2, identity data contained in the memory 10 of a crediting means 1 are transmitted to the centralized processing machine 3 which is to handle the transaction, said data being transmitted, of course, by the specific terminal unit 2 to which the crediting means 1 is connected.

Said identity data is temporarily stored in a register 30 which controls the addressing of the file 32 via an address decoder 31; the file 32 generates the individualization code which corresponds to the identity data and supplies it firstly to the logic unit 34 and secondly to a checking unit 53 intended to check whether it complies with standards.

The checking unit 53 is a conventional logic unit which, for example, performs a parity check and which checks that the code actually corresponds to the code being used. In accordance with the invention the processing machine 3 also includes a binary code number generator 51 which is able to produce numerous different combinations in a random order so as to be able to ascribe an unforeseable number for each new transaction handled, said number being different from any other number already ascribed to a transaction being handled.

Here, it is again stated as a reminder that the centralized processing machines are processors of a usual type. No description of how they are made or of their programs is given unless such a description comes within the scope of the invention.

On receiving a correct individualization code the checking unit 53 causes a buffer register 52 to come into action, said register being located at the output of the coding binary number generator 51 so as to allow a determined binary number to be stored in a memory 54 at the address determined by the received individualization code and said number is also transmitted to a coding input B16 of the crediting means 1 concerned via a transfer register 55 of the centralized processing machine, the link 4 and the terminal unit 2.

The received code number which is stored in a register 16 and the individualization code which is supplied by the code generation logic unit 14 are combined in accordance with a coding algorithm in the code number generation logic unit 15 so as to produce a coding key for the specific terminal unit 2.

The coding key is then applied to a coding circuit 25 of conventional type which, in accordance with an algorithm inherent to it, processes the data to be transmitted via the link 4. In the example chosen said data which is symbolically applied to an OR unit 24 is constituted by the transaction data supplied by the crediting unit 1, by the code number obtained as previously by combining the individualization code with the transaction data in accordance with the coding algorithm in the code number generation logic unit 15 and by the identification and transaction data inherent to the specific terminal unit 2.

The coded data as a whole is transmitted by the link 4 to a decoder 56 which also receives a decoding signal supplied to it by the determination logic unit 34 from the individualization code registered in a buffer memory 57 and from the corresponding code number in the memory 54. In a known manner, said decoding signal can be either identical to the coding signal or different therefrom since it is generated at the same time as the coding signal.

Data processing after decoding is identical in all respects to that described with reference to FIG. 1 and is therefore not described again here.

It must be understood that the illustration of the logic units 15 and 34 is symbolical so as to make it easier to understand the operation thereof, it being understood that generally the processors used in said logic units do not have doubled inputs or outputs, corresponding operation being obtained by successive production of data in two distinct steps.

The invention is also applicable to systems in which the crediting means are connected to specific terminal units which temporarily keep the transaction data since they are not continuously connected to the centralized data processing machines; such a system is illustrated in FIG. 3.

The crediting means illustrated in FIG. 3 is almost the same as those illustrated in the preceding figures although there is not necessarily any keyboard 11; keyboards can then be connected to the specific terminal units 2 which do not have permanent transmission links with the centralized processing machines 3.

Consequently, data is transmitted between the terminal units 2 and the machines 3 either in packages via a temporary transmission connection or via transportable storage means and the centralized processing machines do not perform any check during the exchanges between the crediting means 1 and the specific terminal units 2.

In the same way as previously, each crediting means 1 has a permanent memory 10 for the identity data inherent to it, a confidential code data register 12 and a transaction data register 13. These two registers are linked to the keyboard 11 directly if the keyboard 11 is on the crediting means 1 itself or via connection terminals if it is on the specific terminal 20.

Conventionally, a logic checking unit 14A connected to the register 12 and to a confidential code memory 18 makes it possible to check that the confidential code composed by the bearer of the crediting means 1 is the same as that which is stored permanently in a memory 18.

The memory 18 is preferably of the same type as the memory 10, i.e. it is a permanent memory which is inaccessible from the outside of the credit means after write-in of the confidential code chosen by the bearer of the crediting means.

Logic checking unit 14A is, for example, of the NAND type; it allows access to a logic managing unit 15B which is connected to the transaction data register 12 and to a transaction memory 19 by its inputs. The logic managing unit 15B can possibly be a conventional cabled unit; in a preferred variant it is combined with a code number generation logic unit 15A and is in the form of a microprocessor.

The transaction memory 19 is a conventional read-out and write-in memory under the control of the logic managing unit 15B; it allows, for example, the number, amount and order of bank transactions made by means of the crediting means 1 which has said memory to be stored in the latter.

The generation logic unit 15A is connected to an individualization code memory 17 which is permanent and inaccessible from the outside of the crediting means; it receives transaction data written in by the bearer of the crediting means 1 as well as the transaction number such as defined by the transaction memory 19.

As previously, the code number generation logic unit 15A combines the code coming from the individualization code memory 17 with the data and the transaction number and does so in accordance with a given algorithm; the code number is transmitted to the specific terminal unit 2 via a connection B15.

The specific terminal 2 memorizes the identity of the crediting means, the data concerning the transaction and the code number supplied by the crediting means 1, with the identification and transaction data generated by said specific terminal unit 2; in the example chosen, this is symbolically illustrated by four memories 20, 21, 22 and 26.

The contents of these four memories are transferred at the appropriate time to a centralized processing machine 1 to be processed.

The processing machine 1 is very similar to that illustrated in FIG. 1; it has four memories 30, 33, 35, 39 which correspond respectively to the memories 20, 21, 26 and 22.

The memory 30 makes it possible to memorize the identification data concerning the crediting means and to find the corresponding individualization codes in the file 32 by means of an addressing decoder 31. For each identification data group there is a corresponding code in a file 32, a corresponding transaction data group in the memories 33 and 39 and a corresponding code number in the memory 35.

The algorithmic combination of an individualization code with the corresponding contents in the transaction data memory 33 makes it possible to produce the expected code number which is compared with the code number which corresponds to the contents of the memory 35.

A comparator 36A in charge of the comparison of the code numbers produces either a memorizing signal in a transaction memory 38A or a memorizing signal in an error memory 38B according to whether the result of the comparison is satisfactory or not. Said memorizing signal is transmitted to a buffer registration assembly 37 inserted at the inputs of the memories 38.

Of course, as describes hereinabove the registers and other components of the processing machine 1 are symbolically illustrated so as to show the functions performed rather than the actual circuits which are those of a specialized processor whose constitution is defined as a function of the features of the system taken as a whole.

Likewise, as in the previous cases, the holder and, a fortiori, the bearer of a crediting means 1 does not have access to the individualization code of his crediting means; similarly, neither the owner of a specific terminal unit 2 when the crediting means includes a keyboard nor the processing machine 3 know or have access to the confidential codes chosen by the bearers of crediting means. This limits the risks of fraud at any step of the transaction.

It must also be understood that possibly there can be adopted a means for keeping data confidential in the specific terminal units which is analogous to that adopted for the crediting means, by providing a memory for identifying the terminal unit and the various confidential codes if various persons can be led to use a specific terminal unit as owners or supervisors, it being understood that owners or supervisors are usually neither holders nor bearers of crediting means 1 such as described.

We claim:

1. A security method for confidential digital data communication via an intermediate stage in a system which allows the exchange of transaction data in a transaction between bearers of crediting means (1) and centralized processing machines (3) via non-supervised specific terminal units (2) in which method any communication between a bearer and a processing machine entails communication of the identity of the crediting means used by the bearer to the centralized processing machine by connection of said crediting means to a specific terminal unit and the communication of the holder's specific confidential code to the system by manual insertion of said code by the bearer where the crediting means is linked to the terminal unit, said method further including the following steps:
   determining via the crediting means a first code number for identifying the holder and approving the transaction by combining the transaction data relating to the bearer by means of an individualization code supplied by the crediting means on receiving the holder's confidential code; and
   communicating the first code number, the transaction data and identity of the specific terminal unit to the centralized processing machine by said specific terminal unit on the basis of the data received from the crediting means and of data which is inherent to said specific terminal unit.

2. A method according to claim 1, wherein said individualization code supplied by a crediting means is obtained by combining the confidential code inserted in the crediting means when the latter is connected in a specific terminal with a code base permanently stored in said crediting means.

3. A method according to claim 1, wherein the confidential code inserted by the bearer when the crediting means is connected to be used by the bearer in a specific terminal unit is compared with the confidential code permanently stored in the card and wherein the code number is obtained by combining an individualization code permanently stored in the card with the transaction data inserted by the bearer if the confidential code inserted corresponds to the stored confidential code.

4. A method according to claim 2, further comprising the following extra steps:
   communicating via the centralized processing machine to which a terminal unit is connected a transaction code number to the crediting means connected to said specific terminal unit when said machine receives the identity of said crediting means;
   combining via the crediting means the transaction code number with the individualization signal which said crediting means supplies to generate a coding signal; and
   coding the first code number and the transaction data by said specific terminal by means of the coding signal supplied by the crediting means for the transaction so as to transmit coded data to the centralized processing machine in question.

5. A crediting means for confidential digital data communication via an intermediate stage in a system which allows the exchange of transaction data in a transaction between bearers of crediting means (1) and centralized processing machines (3) via non-supervised specific terminal units (2) wherein any communication between a bearer and a processing machine entails communication of the identity of the crediting means used by the bearer to the centralized processing machine by connection of the crediting means to a specific terminal unit and the communication of the holder's specific confidential code to the system by manual insertion of the code by the bearer where the crediting means is linked to the terminal unit, and which involves determining via the crediting means a first code number for identifying the holder and approving the transaction by combining the transaction data related to the bearer by means of an individualization code supplied by the crediting means upon receiving the holder's confidential code; and communicating said first code number, the transaction data and identity of the specific terminal unit to the centralized processing machine by said specific terminal unit on the basis of the data received from the crediting means and the data which is inherent to said specific terminal unit, and wherein said individualization code supplied by a crediting means is obtained by combining the confidential code inserted in the crediting means when the latter is connected in a specific terminal with a code base permanently stored in said crediting means, and wherein said crediting means includes:

- a permanent memory of the indentity data (10) which can be read out from a specific terminal unit (2) after connection thereto;
- a permanent code signal base memory (17) which is inaccessible to units outside said crediting means (1);
- a code generation logic unit (14) connected to an output of a keyboard (11) and of a code signal base memory (17); and
- a code number generation logic unit (15) which combines the individualization code with the transaction data inserted by the keyboard, the inputs of said code number generation unit being connected to the output of the keyboard (11) and of the individualization code logic unit (14) and by its output to at least one outer connection terminal (B15) for terminal unit (2) with a view to the transmissions of the generated first code number to a centralized processing machine (3).

6. A crediting means according to claim 5, characterized in that the code number generation logic unit (15) has more than one coding input (B16) which is accessible from the outside via a centralized processing machine (3) through a specific terminal unit (2) to which the crediting means is connected so as to generate a code number to be sent to said specific terminal unit by combining the individualization code of the crediting means with a coding number received via the coding input (B16).

7. A crediting means for confidential digital data communication via an intermediate stage in a system which allows the exchange of transaction data in a transaction between bearers of crediting means (1) and centralized processing machines (3) via non-supervised specific terminal units (2) wherein any communication between a bearer and a processing machine entails communication of the identity of the crediting means used by the bearer to the centralized processing machine by connection of the crediting means to a specific terminal unit and the communication of the holder's specific confidential code to the system by manual insertion of the code by the bearer where the crediting means is linked to the terminal unit, and further including determining via the crediting means a first code number for identifying the holder and approving the transaction by combining the transaction data related to the bearer by means of an individualization code supplied by the crediting means upon receiving the holder's confidential code; and communicating the first code number, the transaction data and identity of the specific terminal unit to the centralized processing machine by said specific terminal unit on the basis of the data received from the crediting means and the data which is inherent to said specific terminal unit, and wherein the confidential code inserted by the bearer when the crediting means is connected to be used by the bearer in a specific terminal is compared with the confidential code permanently stored in the card, and wherein the first code number is obtained by combining an individualization code permanently stored in the card with a transaction data inserted by the bearer if the confidential code inserted corresponds to the stored confidential code, and wherein said crediting means is conventionally provided with memories (10, 18, 19) for identifying said means, the confidential code and the transaction as well as logic units (15B, 14A) for managing the transactions and for comparing the confidential code stored with the confidential code inserted in each transaction, said crediting means further including:

- a memory (17) for permanently storing the individualization code which is inaccessible from outside the crediting means;
- a code number generation logic unit (15A) which combines the individualization code of the crediting means (1) with the data inserted by the keyboard (11) and the transaction number, the inputs of said generation logic unit being connected for said purpose to the outputs of the logic unit (15B) which manages the transactions and of the individualization code memory (17) and its output being connected to at least one outside connection terminal (B15) with a view to transmitting the first code number thereby generated to the specific terminal unit (2) to which said crediting means (1) is connected.

8. A crediting means according to claim 7 in which the code number generation logic unit (15A) and the logic managing unit (15B) are one and the same unit.

* * * * *